United States Patent
Manaka et al.

(10) Patent No.: US 7,606,116 B2
(45) Date of Patent: Oct. 20, 2009

(54) ANALOGUE ELECTRONIC CLOCK AND MOTOR CONTROL CIRCUIT

(75) Inventors: Saburo Manaka, Chiba (JP); Kenji Ogasawara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/628,047

(22) PCT Filed: Jun. 1, 2005

(86) PCT No.: PCT/JP2005/010016

§ 371 (c)(1),
(2), (4) Date: Jan. 25, 2007

(87) PCT Pub. No.: WO2005/119377

PCT Pub. Date: Dec. 15, 2005

(65) Prior Publication Data

US 2008/0089183 A1    Apr. 17, 2008

(30) Foreign Application Priority Data

Jun. 4, 2004    (JP) .............................. 2004-167363

(51) Int. Cl.
G04B 17/20    (2006.01)
G05D 3/00    (2006.01)

(52) U.S. Cl. ........................ 368/157; 368/160; 318/696

(58) Field of Classification Search ................ 318/696; 368/160
See application file for complete search history.

(56) References Cited

U.S. PATENT DOCUMENTS

| | | | | |
|---|---|---|---|---|
| 4,272,837 A | * | 6/1981 | Ueda et al. | 368/80 |
| 5,550,795 A | * | 8/1996 | Takakura et al. | 368/157 |
| 5,889,734 A | * | 3/1999 | Sato | 368/157 |
| 7,283,428 B2 | * | 10/2007 | Ogasawara | 368/157 |

FOREIGN PATENT DOCUMENTS

JP    5385467    7/1978

* cited by examiner

Primary Examiner—Vit W Miska
Assistant Examiner—Sean Kayes
(74) Attorney, Agent, or Firm—Adams & Wilks (57) ABSTRACT

The present invention can rotationally drive a motor with main drive pulses corresponding to loads with the simple constitution without using a counter circuit. A control circuit, in driving a motor with a second main drive pulse, when a rotation detection signal which is indicative of the rotation of the motor is detected by a rotation detection circuit after a predetermined reference time elapses, continues rotational driving of the motor with the second main drive pulse, when the rotation direction signal is detected before the predetermined reference time elapses, changes the rotational driving of the motor with a first main drive pulse having a shorter pulse width than the second main drive pulse, and when the rotation detection signal is not detected, forcibly rotationally drives the motor with a correction drive pulse having a largest pulse width and, thereafter, rotationally drives the motor with the first main drive pulse.

21 Claims, 8 Drawing Sheets

ANALOGUE ELECTRONIC CLOCK AND MOTOR CONTROL CIRCUIT

CROSS-REFERENCE TO RELATED APPLICATIONS

This application is a U.S. national stage application of International Application No. PCT/JP2005/010016, filed Jun. 1, 2005, claiming a priority date of Jun. 4, 2004, and published in a non-English language.

BACKGROUND OF THE INVENTION

1. Field of the Invention

The present invention relates to an analogue electronic clock and a motor control circuit which is suitably applicable to an analogue electronic clock or the like.

2. Description of the Prior Art

Conventionally, an analogue electronic clock which is configured to rotationally drive time hands for displaying time such as a hour hand, a minute hand and the like using a motor has been used. The analogue electronic clock includes the motor which rotationally drives the time hands and a motor control circuit which controls the rotation of the motor, wherein by rotationally driving the motor by the motor control circuit based on time signals which constitute references of time, the time hands can perform a time display.

In the electronic clock which is described in JP-B-61-15385, for rotationally driving the motor which serves to drive the time hands, the motor is rotationally driven by selectively using a plurality of main drive pulses, and when a rotation detection circuit detects that the motor is not rotated, the motor is rotationally driven using an auxiliary drive pulse having a larger pulse width than widths of the above-mentioned respective main drive pulses thus realizing the rotational driving with minimum energy corresponding to a motor load.

For example, a load such as an electronic clock calendar cannot be driven with the main drive pulse having a minimum pulse width (minimum energy) and hence, after performing the rotational driving with the correction drive pulse temporarily, the rotational driving is performed by changing the main drive pulse to the main drive pulse having the larger energy (the larger pulse width) than the minimum energy drive pulse (pulse-up).

When the large load is continued, the rotational driving with the main drive pulse having the large pulse width which is proportional to the load is continued. When the large load disappears and the load becomes small, upon detecting that the motor is stably driven for a fixed time with the drive pulse, the motor is rotationally driven by changing the main drive pulse to the main drive pulse having small energy (small pulse width) (pulse-down) thus realizing the low power consumption.

However, in performing the pulse-down along with the decrease of the load, the motor is configured such that when the motor is stably driven with the main drive pulses by predetermined times at this point of time, the pulse-down is performed. Accordingly, the fact that the normal rotational drive operation with the main drive pulse at this point of time is continuously performed predetermined times is counted by a counter circuit, and when the counter circuit counts the rotational drive operation the above-mentioned predetermined times, the pulse-down is performed thus changing the main pulse width to the main drive pulse having the pulse width corresponding to the magnitude of the load.

Accordingly, the counter circuit is necessary in the analogue electronic clock and hence, in an attempt to form only an electronic circuit which constitutes a motor control circuit or an electronic circuit which constitutes an electronic clock including the motor control circuit into an integrated circuit (IC), there exists a drawback that an IC chip size cannot be reduced.

Further, the pulse width to be changed, the pulse-width changing timing and the like in performing the pulse-down differ for respective products and hence, there exists a drawback that the circuit constitution becomes complicated to cope with the respective products.

Further, in performing the pulse-down, it is necessary to perform the rotational driving with the main drive pulse having the pulse width larger than the necessary pulse width predetermined times and hence, there exists a drawback that the power consumption is increased. Accordingly, in an electronic clock or the like which uses a battery as a power source, there arises a drawback that the battery lifetime becomes short and the number of battery change is increased thus making the battery changing operation cumbersome.

It is an object of the present invention to provide a motor control circuit which can rotationally drive a motor with a main drive pulse having a pulse width corresponding to a motor load with the simple constitution without using a counter circuit.

Further, it is an object of the present invention to provide a motor control circuit which can realize the low power consumption.

Further, it is an object of the present invention to provide an analogue electronic clock which can rotationally drive a motor with a main drive pulse having a pulse width corresponding to a motor load with the simple constitution without using a counter circuit.

Further, it is an object of the present invention to provide an analogue electronic clock which can realize the low power consumption.

SUMMARY OF THE INVENTION

According to the present invention, there is provided a motor control circuit which includes: a rotation detection means which detects a rotation detection signal in response to a rotation of a motor and detects whether the motor is rotated or not based on the rotation detection signal; and a control means which selects a main drive pulse corresponding to a magnitude of a load of the motor out of a plurality of main drive pulses which differ in energy from each other and drives the motor with the selected main drive pulse and, at the same time, when the rotation detection means detects that the motor is not rotated by the rotational driving with the main drive pulse based on the rotation detection signal, forcibly rotationally drives the motor with a correction drive pulse having energy larger than respective main drive pulses, wherein the control means selects any one of the main drive pulses out of the plurality of main drive pulses based on the relationship of a magnitude between a time until the rotation detection signal which is indicative of the rotation of the motor is detected by the rotation detection means and a predetermined reference time, and rotationally drives the motor based on the selected main drive pulse.

A control means selects any one of main drive pulses out of a plurality of main drive pulses based on the relationship of a magnitude between a time until a rotation detection signal which is indicative of a rotation of a motor is detected by a rotation detection means and a predetermined reference time, and rotationally drives the motor based on the selected main drive pulse.

Here, the control means may be configured such that the control means, in rotationally driving the motor with the main drive pulse, when the rotation detection signal which is indicative of the rotation of the motor is detected by the rotation detection means after a lapse of the reference time, rotationally drives the motor without changing the main drive pulse.

Further, the control means may be configured such that the control means, in rotationally driving the motor with the main drive pulse, when the rotation detection signal which is indicative of the rotation of the motor is detected by the rotation detection means before a lapse of the reference time, selects the main drive pulse having smaller energy than the main drive pulse used for the rotational driving and rotationally drives the motor with the selected main drive pulse.

Further, according to the present invention, there is provided a motor control circuit which includes: a rotation detection means which detects a rotation detection signal in response to a rotation of a motor and detects whether the motor is rotated or not based on the rotation detection signal; and a control means which selects a main drive pulse corresponding toga magnitude of a load of the motor out of a plurality of main drive pulses which differ in energy from each other and rotationally drives the motor and, at the same time, when the rotation detection means detects that the motor is not rotated by the rotational driving with the main drive pulse based on the rotation detection signal, forcibly rotationally drives the motor with a correction drive pulse having energy larger than respective main drive pulses, wherein the control means, in driving the motor with the first main drive pulse having a first pulse width, when the rotation detection signal which is indicative of the rotation of the motor is detected by the rotation detection means, continues the rotational driving of the motor with the first main drive pulse and, at the same time, when the rotation detection signal which is indicative of the rotation of the motor is not detected by the rotation detection means, rotationally drives the motor with the correction drive pulse and, thereafter, rotationally drives the motor with the second main drive pulse having a larger pulse width than the first main drive pulse, the control means, in driving the motor with the second main drive pulse, when the rotation detection signal which is indicative of the rotation of the motor is detected by the rotation detection means and the rotation detection signal which is indicative of the rotation of the motor is detected by the rotation detection means after a lapse of a predetermined reference time, continues the rotational driving of the motor with the second main drive pulse, the control means, in driving the motor with the second main drive pulse, when the rotation detection signal which is indicative of the rotation of the motor is detected by the rotation detection means and the rotation detection signal which is indicative of the rotation of the motor is detected by the rotation detection means before a lapse of the predetermined reference time, changes the rotational driving of the motor with the first main drive pulse, and the control means, in driving the motor with the second main drive pulse, when the rotation detection signal which is indicative of the rotation of the motor is not detected by the rotation detection means, rotationally drives the motor with the first main drive pulse after the motor is rotationally driven with the correction drive pulse.

A control means, in driving a motor with a first main drive pulse having a first pulse width, when a rotation detection signal which is indicative of the rotation of the motor is detected by a rotation detection means, continues the rotational driving of the motor with a first main drive pulse and, at the same time, when the rotation detection signal which is indicative of the rotation of the motor is not detected by the rotation detection means, rotationally drives the motor with a correction drive pulse and, thereafter, rotationally drives the motor with a second main drive pulse having a larger pulse width than the first main drive pulse, the control means, in driving the motor with the second main drive pulse, when the rotation detection signal which is indicative of the rotation of the motor is detected by the rotation detection means and the rotation detection signal which is indicative of the rotation of the motor is detected by the rotation detection means after a lapse of a predetermined reference time, continues the rotational driving of the motor with the second main drive pulse, the control means, in driving the motor with the second main drive pulse, when the rotation detection signal which is indicative of the rotation of the motor is detected by the rotation detection means and the rotation detection signal which is indicative of the rotation of the motor is detected by the rotation detection means before a lapse of the predetermined reference time, changes the rotational driving of the motor with the first main drive pulse, and the control means, in driving the motor with the second main drive pulse, when the rotation detection signal which is indicative of the rotation of the motor is not detected by the rotation detection means, rotationally drives the motor with the first main drive pulse after the motor is rotationally driven with the correction drive pulse.

Further, the control means may be configured such that, the control means, in rotationally driving the motor with the main drive pulse having small energy, when the rotation detection signal which is indicative of the rotation of the motor is detected by the rotation detection means before a lapse of a first reference time, rotationally drives the motor without changing the main drive pulse.

Further, the control means may be configured such that the control mean's, in rotationally driving the motor with the main drive pulse having small energy, when the rotation detection signal which is indicative of the rotation of the motor is detected by the rotation detection means after a lapse of the first reference time, changes the drive pulse such that the control means rotationally drives the motor with the main drive pulse having the larger energy than the main drive pulse.

Further, the control means may be configured such that the control means, in rotationally driving the motor with the main drive pulse having large energy, when the rotation detection signal which is indicative of the rotation of the motor is detected by the rotation detection means before a lapse of a second reference time, changes the drive pulse such that the control means rotationally drives the motor with the main drive pulse having the smaller energy than the main drive pulse.

Further, the control means may be configured such that the control means, in rotationally driving the motor with the main drive pulse having large energy, when the rotation detection signal which is indicative of the rotation of the motor is detected by the rotation detection means after a lapse of the second reference time, rotationally drives the motor without changing the main drive pulse.

Further, the control means may be configured such that the control means, in rotationally driving the motor with the main drive pulse, when the rotation detection signal which is indicative of the motor is not detected by the rotation detection means, rotationally drives the motor with the correction drive pulse.

Further, according to the present invention, there is provided a motor-control circuit which includes: a rotation detection means which detects a rotation detection signal in response to a rotation of a motor and detects whether the motor is rotated or not based on the rotation detection signal; and a control means which selects a main drive pulse corresponding to a magnitude of a load of the motor out of a plurality of main drive pulses which differ in energy from each other and rotationally drives the motor and, at the same time, when the rotation detection means detects that the motor is not rotated by the rotational driving with the main drive pulse based on the rotation detection signal, forcibly rotationally drives the motor with a correction drive pulse having energy larger than respective main drive pulses, wherein the control means, in rotationally driving the motor with the first main drive pulse having a first pulse width, when the rotation detection signal which is indicative of the rotation of the motor is detected by the rotation detection means before a lapse of a first reference time, rotationally drives the motor without changing the main drive pulse, the control means, in rotationally driving the motor with the first main drive pulse, when the rotation detection signal which is indicative of the rotation of the motor is detected by the rotation detection means after a lapse of the first reference time, changes the drive pulse such that the motor is rotationally driven with the second main drive pulse having larger energy than the first main drive pulse, the control means, in rotationally driving the motor with the second main drive pulse, when the rotation detection signal which is indicative of the rotation of the motor is detected by the rotation detection means before a lapse of a second reference time, changes the drive pulse such that the motor is rotationally driven with the first main drive pulse, the control means, in rotationally driving the motor with the second main drive pulse, when the rotation detection signal which is indicative of the rotation of the motor is detected by the rotation detection means after a lapse of the second reference time, rotationally drives the motor without changing the main drive pulse, and the control means, in rotationally driving the motor with the first or second main drive pulse, when the rotation detection signal which is indicative of the rotation of the motor is not detected by the rotation detection means, rotationally drives the motor with the correction driving pulse.

A control means, in rotationally driving a motor with a first main drive pulse having a first pulse width, when a rotation detection signal which is indicative of the rotation of the motor is detected by the rotation detection means before a lapse of a first reference time, rotationally drives the motor without changing the main drive pulse, the control means, in rotationally driving the motor with the first main drive pulse, when the rotation detection signal which is indicative of the rotation of the motor is detected by the rotation detection means after a lapse of the first reference time, changes the drive pulse such that the motor is rotationally driven with a second main drive pulse having larger energy than the first main drive pulse, the control means, in rotationally driving the motor with the second main drive pulse, when the rotation detection signal which is indicative of the rotation of the motor is detected by the rotation detection means before a lapse of a second reference time, changes the drive pulse such that the motor is rotationally driven with the first main drive pulse, the control means, in rotationally driving the motor with the second main drive pulse, when the rotation detection signal which is indicative of the rotation of the motor is detected by the rotation detection means after a lapse of the second reference time, rotationally drives the motor without changing the main drive pulse, and the control means, in rotationally driving the motor with the first or second main drive pulse, when the rotation detection signal which is indicative of the rotation of the motor is not detected by the rotation detection means, rotationally drives the motor with a correction driving pulse.

The first and second reference times may be set to an equal time.

Further, according to the present invention, there is provided an analogue electronic clock which includes: a motor which rotationally drives a clock hand; and a motor control circuit which performs a time counting operation in response to a time signal which constitutes a reference of time and controls the rotation of the motor, the analogue electronic clock is capable of performing a time display using the clock hand by rotationally driving the motor by the motor control circuit, wherein the motor control circuit is constituted of the motor control circuit described in any one of claims.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

Figure 1:
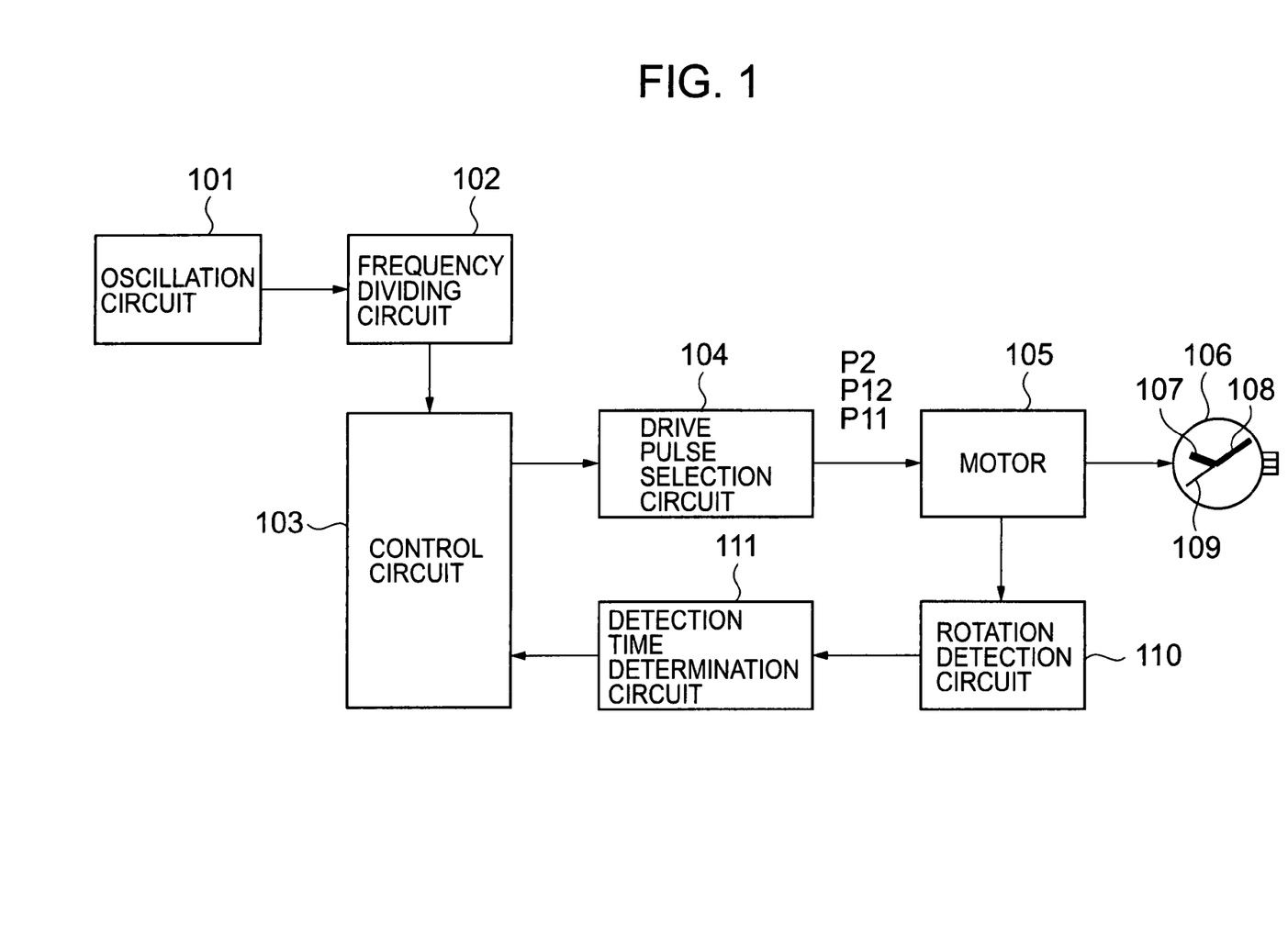
FIG. 1 is a block diagram of an analogue electronic clock according to an embodiment of the present invention.

FIG. 1 is a block diagram of an analogue electronic clock according to an embodiment of the present invention and shows an example of an analogue electronic wrist watch.

In FIG. 1, the electronic clock includes an oscillation circuit 101 which oscillates a signal of a predetermined frequency, a frequency dividing circuit 102 which generates clock signals which become references at the time of timer counting by dividing a signal generated by the oscillation circuit 101, a control circuit 103 which performs controls such as a control of respective electronic circuit components which constitute the electronic clock, a change control of drive pulses and the like, a drive pulse selection circuit 104 which selects and outputs a drive pulse for motor rotational driving based on a control signal from the control circuit 103, a motor 105 which is rotationally driven based on the drive pulse from the drive pulse selection circuit 104, an analogue display part 106 which includes time hands (three kinds of time hands consisting of an hour hand 107, a minute hand 108, a second hand 109 in the example shown in FIG. 1) which are rotationally driven by the motor 105 and indicate the time, a rotation detection circuit 110 which detects a rotation detection signal which expresses a rotation state from the motor 105, and a detection time determination circuit 111 which determines a magnitude relationship between a time from a predetermined time (for example, a point of time at which the supply of the drive pulse to the motor 105 is started or a point of time at which the supply of the drive pulse is finished) to a point of time at which a rotation detection signal which is indicative of the rotation of the motor 105 detects and a predetermined reference time.

The rotation detection circuit 110 has the constitution substantially equal to the constitution of the rotation detection circuit described in the above-mentioned JP-B-61-15385 and is configured such that the rotation detection circuit 110 can detect the rotation detection signal of a level which exceeds a predetermined reference signal voltage Vcomp when the motor 105 is rotated and cannot detect the rotation detection signal of the level which exceeds the above-mentioned predetermined reference signal voltage Vcomp when the motor 105 is not rotated.

Here, the control circuit 103, the drive pulse selection circuit 104, the rotation detection circuit 110 and the detection time determination circuit 111 constitute a motor control circuit. Further, the control circuit 103, the drive pulse selection circuit 104, and the detection time determination circuit 111 constitute a control means or drive control circuit (hereinafter referred to as simply control means)

Figure 2:
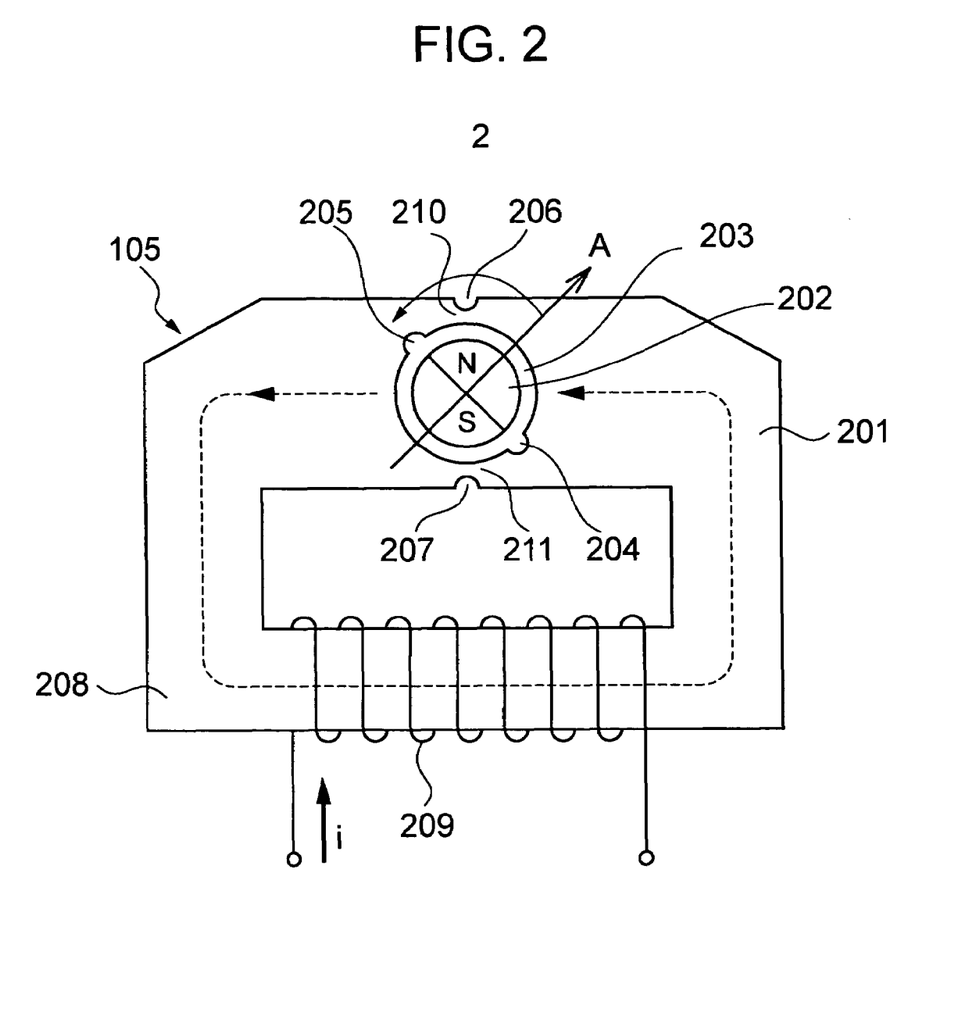
FIG. 2 is a constitutional view of a stepping motor used in the analogue electronic clock according to the embodiment of the present invention.

FIG. 2 is a constitutional view of the motor 105 used in the embodiment of the present invention and shows an example of a clock-use stepping motor which is generally used in an analogue electronic clock.

In FIG. 2, the motor 105 includes a stator 201 which has a rotor housing through hole 203, a rotor 202 which is rotationally disposed in the rotor housing through hole 203, a magnetic core 208 which is integrally formed with the stator 201, and a coil 209 which is wound around the magnetic core 208. In using the motor 105 in the electronic clock, the stator 201 and the magnetic core 208 are fixedly mounted on a dial plate (not shown in the drawing) using small bolts (not shown in the drawing).

The rotor 202 is polarized in two poles (S pole and N pole). In an outer end portion of the stator 201 which is formed of a magnetic material, a plurality of (two in this embodiment) cutout portions (outer notches) 206, 207 are formed at positions which face each other with the rotor housing through hole 203 sandwiched there between. Saturable portions 210, 211 are formed between the respective outer notches 206, 207 and the rotor housing through hole 203.

The saturable portions 210, 211 are configured such that the saturable portions 210, 211 are not magnetically saturated with a magnetic flux of the rotor 202 but are magnetically saturated when the coil 209 is excited and increase magnetic resistance thereof. The rotor housing through hole 203 has a profile thereof formed in a circular shape in which a plurality of (two in this embodiment) half-moon like cut out portions (inner notches) 204, 205 are formed integrally in oppositely facing portions of a circular through hole.

The cutout portions 204, 205 form positioning portions which determine a stop position of the rotor 202. In a state that the coil 209 is not excited, the rotor 202 is, as shown in FIG. 2, stably stopped at a position corresponding to the positioning portions as shown in FIG. 2, that is, the positions at which a magnetic pole axis A of the rotor 202 is orthogonal to a line segment which connects the cutout portions 204, 205.

Here, when a drive pulse having a square wave shape is supplied to the coil 209 from the drive pulse selection circuit 104 so that an electric current "i" is made to flow in the arrow direction in FIG. 2, a magnetic flux is generated in the stator 201 in the arrow direction indicated by a broken line. Accordingly, the saturable portions 210, 211 are saturated and the magnetic resistance thereof is increased and, thereafter, due to an interaction between a magnetic pole generated by the stator 201 and a magnetic pole generated by the rotor 202, the rotor 202 is incrementally rotated by 180° in the direction indicated by an arrow in FIG. 2 and is stably stopped.

Next, when an inverse-polarity drive pulse having a square wave shape is supplied to the coil 209 from the drive pulse selection circuit 104 so that an electric current is made to flow in the direction opposite to the arrow direction in FIG. 2, a magnetic flux is generated in the stator 201 in the direction opposite to the arrow direction indicated by the broken lie. Accordingly, the saturable portions 210, 211 are firstly saturated and, thereafter, due to an interaction between a magnetic pole generated by the stator 201 and a magnetic pole generated by the rotor 202, the rotor 202 is incrementally rotated by 180° in the same direction as the above-mentioned direction and is stably stopped.

Thereafter, by supplying signals which differ in polarities (AC signals) to the coil 209, the above-mentioned operation is repeatedly performed thus realizing the continuous rotation of the rotor 202 in the direction indicated by the arrow for every 180 degrees. Here, in this embodiment, as the drive pulse, as described later, a plurality of main drive pulses P11, P12 and a correction drive pulse P2 are used.

Figure 3:
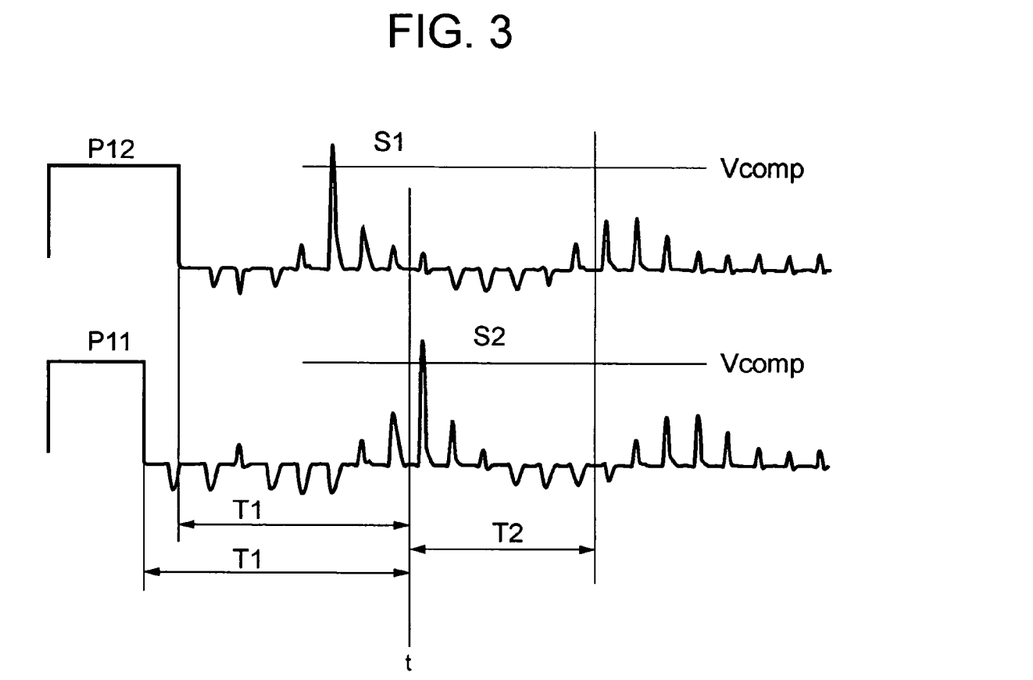
FIG. 3 are timing charts showing an operation of the analogue electronic clock according to the embodiment of the present invention.

FIG. 3 is a timing chart showing a plurality of (two kinds in this embodiment) main drive pulses (the first main drive pulse P11 having a first pulse width, the second main drive pulse P12 having a second pulse width) used in this embodiment and a rotation detection signal which expresses whether the motor 105 is rotated or not in this embodiment.

In FIG. 3, the main drive pulses P11, P12 are pulse signals which have a square wave shape which differ in drive energy (pulse width in this embodiment) from each other, and the main drive pulse P11 has the smaller energy than the main drive pulse P12, in other words, has the smaller pulse width than the main drive pulse 12. As described later, the correction drive pulse P2 having a third pulse width is configured to possess the larger energy (larger pulse width) than the main drive pulses P11, P12. That is, the respective drive pulses P11, P12, P2 have the respective pulse widths thereof set in order of P11<P12<P2.

Out of the rotation detection signals shown in FIG. 3, the rotation detection signals S1, S2 of levels which exceed the predetermined reference signal voltage Vcomp are rotation detection signals which are indicative of the rotation of the motor 105, while the rotation detection signals of levels which are equal to or below the predetermined reference signal voltage Vcomp are rotation detection signals which are detected when the motor 105 is not rotated.

Here, the main drive pulses P11, P12 are drive pulses for continuously rotationally driving the motor 105, while the correction drive pulse P2 is a drive pulse which is temporarily used for forcibly rotationally driving the motor 105 when a load of the motor 105 is increased so that the motor 105 cannot be rotationally driven with the main drive pulses P11, P12.

Although explained in detail later, this embodiment is made by focusing on a following phenomenon. That is, when the pulse width of the main drive pulse is proper or large compared to a magnitude of a load of the motor 105, the motor 105 is rotated fast and hence, the rotation detection signal which is indicative of the rotation of the motor 105 is generated at an early time, when the pulse width of the main drive pulse is small compared to the magnitude of the load of the motor 105, the motor 105 is rotated more slowly and hence, the rotation detection signal which is indicative of the rotation of the motor 105 is generated at a delayed time, and when the pulse width of the main drive pulse is excessively small compared to the magnitude of the load of the motor 105, the motor 105 is not rotated and hence, the rotation detection signal which is indicative of the rotation of the motor 105 is not generated. That is, this embodiment is configured to select either one of the plurality of main drive pulses P11, P12 based on the magnitude relationship between time from a predetermined reference time (in FIG. 3, a point of time that the supply of the main drive pulses P11, P12 to the motor 105 is finished in FIG. 3) to a point of time at which the rotation detection signal which is indicative of the rotation of the motor 105 is detected by a rotation detection circuit 110 and a predetermined reference time "t" and rotationally drives the motor 105 with the selected main drive pulse.

That is, this embodiment is configured such that either one of the plurality of main drive pulses P11, P12 is selected corresponding to the magnitude of the load and the motor 105 is driven with the selected main drive pulse, wherein when the load is small, the motor 105 is rotationally driven with the main drive pulse P11 and when the load is large so that the motor 105 is not rotationally driven with the main drive pulse P1, the motor 105 is rotationally driven with the main drive pulse P12.

In rotationally driving the motor 105 with the main drive pulse P11, when it is determined by the detection time determination circuit 111 that the rotation detection signal S2 which is indicative of the rotation of the motor 105 is generated at the point of time later than the predetermined reference time "t" (within T2), that is, when the rotation detection signal S2 which is indicative of the rotation of the motor 105 is detected by the rotation detction circuit 110 after the predetermined reference time "t" elapses, the control circuit 103 determines that the rotational driving is performed with proper energy for the load of the motor 105 and continues the rotational driving of the motor 105 with the main drive pulse P11.

In rotationally driving the motor 105 with the main drive pulse P12, when it is determined by the detection time determination circuit 111 that the rotation detection signal S1 which is indicative of the rotation of the motor 105 is generated at the point of time earlier than the predetermined reference time "t" (within T1), that is, when the rotation detection signal S2 which is indicative of the rotation of the motor 105 is detected by the rotation detection circuit 110 before the predetermined reference time "t" elapses, the control circuit 103 determines that the rotational driving is performed with the main drive pulse P12 proper for the load of the motor 105 and continues the rotational driving of the motor 105 with the main drive plse P12.

Figure 4:
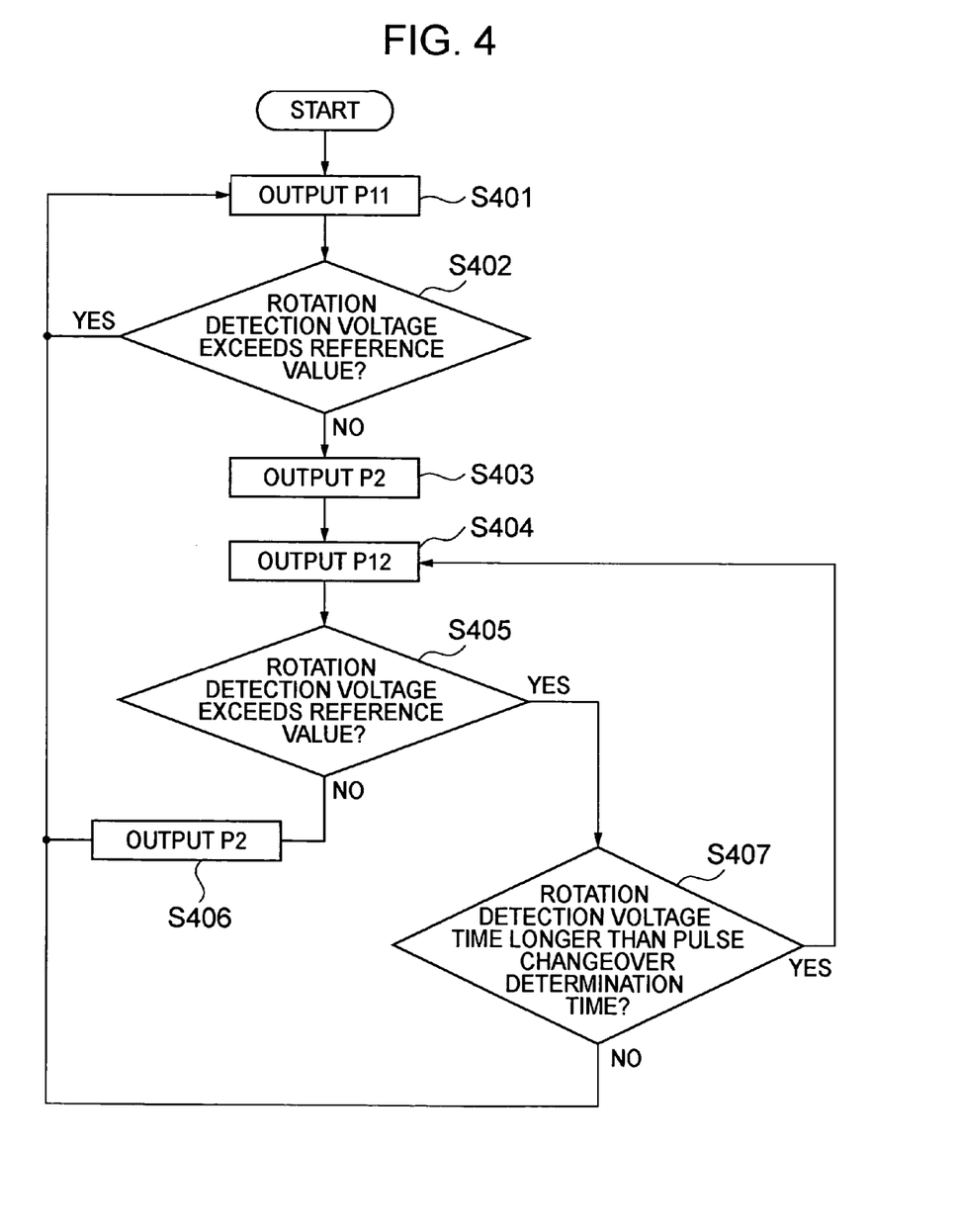
FIG. 4 is a flow chart showing the manner of operation of the analogue electronic clock according to an embodiment of the present invention.

FIG. 4 is a flowchart showing the manner of operation. Of the analogue electronic clock according to this embodiment of the present invention and is mainly a flowchart showing processing of the control circuit 103.

FIG. 5 is a timing chart showing the manner of operation of the analogue electronic clock according to this embodiment of the present invention.

Hereinafter, in conjunction with FIG. 1 to FIG. 5, the manner of operation of the analogue electronic clock according to this embodiment of the present invention and the manner of operation of the motor control circuit suitably applicable to the analogue electronic clock are explained.

In FIG. 1, the oscillation circuit 101 generates the reference clock signal having the predetermined frequency, and the frequency dividing circuit 102 generates clock signals which become the references of timer counting by dividing the frequency of the above-mentioned signal generated by the oscillation circuit 101 and outputs the clock signals to the control circuit 103.

Figure 5A:
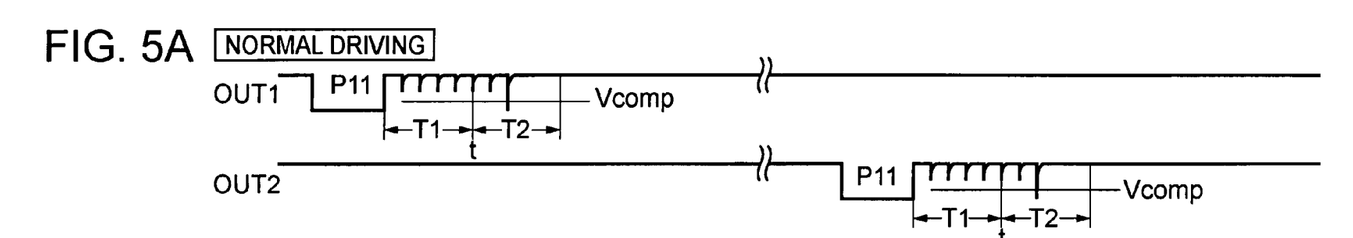
FIG. 5 is a timing chart showing an operation of the analogue electronic clock according to the embodiment of the present invention.

First of all, the usual drive operation (see FIG. 5A) in which the motor load is small and the motor 105 is rotationally driven with the main drive pulse P11 is explained.

In this case, firs to fall, the control circuit 103 performs the timer counting by counting the above-mentioned time signals and, at predetermined timing, generates a control signal for rotationally driving the motor 105 with the first main drive pulse P11 having the short pulse width (step S401 in FIG. 4).

The drive pulse selection circuit 104, in response to the control signal from the control circuit 103, rotationally drives the motor 105 with the main drive pulse P11. The motor 105 is rotationally driven with the main drive pulse P11 and rotationally drives the time hands 107 to 109. Accordingly, the display part 106 sequentially displays the present time using the time hands 107 to 109.

The rotation detection circuit 110 detects the rotation detection signal which is indicative of a rotation state from the motor 105 and outputs the rotation state to the detection time determination circuit 111. The detection time determination circuit 111 compares the rotation detection signal from the rotation detection circuit 110 and the predetermined reference signal voltage Vcomp, determines whether the rotation detection signal voltage exceeds the predetermined reference signal voltage Vcomp or not, that is, whether the motor 105 is rotated or not, and notifies whether the motor 105 is rotated or not to the control circuit 103. Further, when the detection time determination circuit 111 detects the rotation detection signal which exceeds the above-mentioned reference signal voltage Vcomp, the detection time determination circuit 111 compares the time from the completion of supply of the main drive pulse P11 to the motor 105 to the point of time that the rotation detection signal is generated with the predetermined reference time "t", and notifies whether the time to the point of time that the rotation detection signal is generated is larger than the reference time "t" or not to the control circuit 103.

The control circuit 103, based on the information from the detection time determination circuit 111, determines whether the voltage of the rotation detection signal exceeds the reference signal voltage. Vcomp or not, that is, whether the motor 105 is rotated or not (step S402).

When the control circuit 103 determines that the rotation detection signal voltage exceeds the reference signal voltage Vcomp, that is, the motor 105 is rotated in step S402, this implies that the load of the motor 105 is of a magnitude which allows the driving of the motor 105 with the main drive pulse P11. Accordingly, the processing returns to step S401 and the control circuit 103 outputs the control signal for continuously rotationally driving the motor 105 with the main drive pulse P11 to the drive pulse selection circuit 104. The drive pulse selection circuit 104 continuously rotationally drives the motor 105 with the main drive pulse P11 in response to the control signal from the control circuit 103. By repeating the above-mentioned steps, the usual drive operation is performed.

Figure 5B:
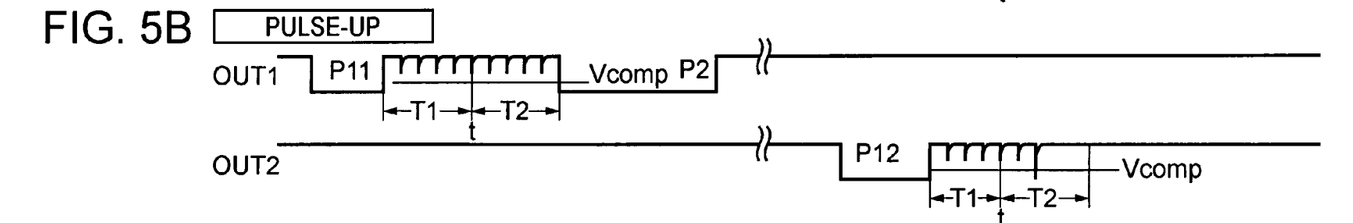

Next, the pulse-up operation is explained (FIG. 5B). When the control circuit 103 determines that the rotation detection signal voltage does not exceed the reference signal voltage Vcomp, that is, the motor 105 is not rotated in step S402, this implies that the load of the motor 105 is not of a magnitude which allows the driving of the motor 105 with the main drive pulse P11. Accordingly, the control circuit 103 outputs the control signal for rotationally driving the motor 105 with the correction drive pulse P2 temporarily to the drive pulse selection circuit 104 (step S403).

The drive pulse selection circuit 104 rotationally drives the motor 105 with the correction drive pulse P2 in response to the above-mentioned control signal from the control circuit 103. Accordingly, the motor 105 which is not driven with the main drive pulse P11 is driven and rotated with the correction drive pulse P2 which immediately follows the main drive pulse P11.

When the load of the motor 105 is increased extremely momentarily, by performing the driving of the motor 105 with the main drive pulse P11 in the next step, there is enough possibility that the motor 105 is rotated. However, in general, the possibility that the motor 105 is rotationally driven is small and hence, in the next step, the control circuit 103 performs a control such that the motor 105 is rotationally driven with the main drive pulse P12 to ensure the rotation in a more reliable manner (step S404). The drive pulse selection circuit 104 rotationally drives the motor 105 with the main drive pulse P12 under the control of the control circuit 103.

Figure 5C:
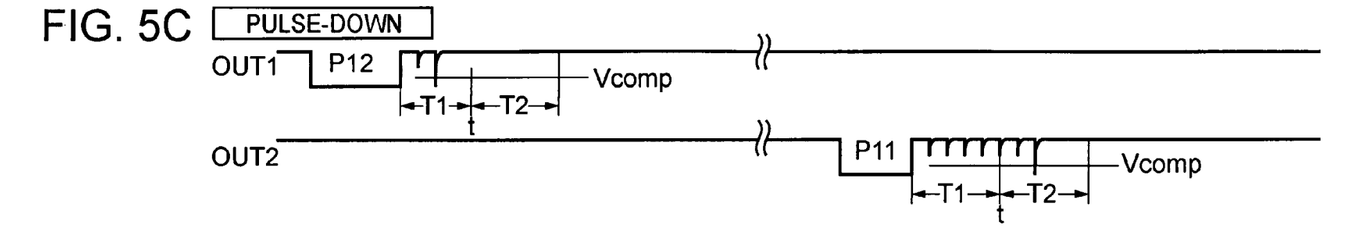

Next, the pulse-down operation is explained (see FIG. 5C). The control circuit 103, after rotationally driving the motor 105 with the main drive pulse P12 in step S404, determines whether the rotation detection signal voltage exceeds the reference signal voltage Vcomp or not, that is, the motor 105 is rotated or not based on the information from the detection time determination circuit 111 (step S405)

When the control circuit 103 determines that the rotation detection signal voltage does not exceed the reference signal voltage Vcomp, that is, the motor 105 is not rotated in step S405, this implies that the load of the motor 105 is not of a magnitude which allows the driving of the motor 105 with the main drive pulse P12. Accordingly, the control circuit 103 outputs the control signal for rotationally driving the motor 105 with the correction drive pulse P2 temporarily to the drive pulse selection circuit 104 (step S406). The drive pulse selection circuit 104 rotationally drives the motor 105 with the correction drive pulse P2 in response to the above-mentioned control signal from the control circuit 103. Accordingly, the motor 105 which is not driven with the main drive pulse P12 is driven and rotated with the correction drive pulse P2 which immediately follows the main drive pulse P12. The load of the motor 105 is temporarily increased, and once the motor 105 is rotated, there exists a possibility that the load is decreased. Accordingly, the control circuit 103, after executing the processing in step S406, returns to step S401 and performs the rotational drive control of the motor 105 with the main drive pulse P11.

When the control circuit 103 determines that the rotation detection signal voltage exceeds the reference signal voltage Vcomp, that is, the motor 105 is rotated in step S405, the control circuit 103 compares the time from the completion of supply of the main drive pulse P12 to the motor 105 to the point of time that the rotation detection signal is generated with the reference time "t" and determines whether the time to the point of time that the rotation detection signal is generated is longer than the predetermined reference time "t" or not (that is, whether the time to the point of time that the rotation detection signal is generated falls within the time T1 side before the reference time "t" or within the time T2 side after the reference time "t") (step S407).

When the control circuit 103 determines that the time from the completion of supply of the main drive pulse P12 to the motor 105 to the point of time that the rotation detection signal is generated is longer than the reference time "t", the control circuit 103 determines that the load of the motor 105 is of a magnitude which is proper to perform the rotational driving of the motor 105 with the main drive pulse P12. Accordingly, the control circuit 103 returns to step S404 and the control circuit 103 continues the rotational driving of the motor 105 with the main drive pulse P12.

On the other hand, when the control circuit 103 determines that the time from the completion of supply of the main drive pulse P12 to the motor 105 to the point of time that the rotation detection signal is generated is shorter than the reference time "t", in step 407, the control circuit 103 determines that the load of the motor 105 is of a magnitude which is too small to perform the rotational driving of the motor 105 with the main drive pulse P12 (the driving with the main drive pulse P12 causes a large power loss). Accordingly, the processing returns to step S401 and the control circuit 103 performs the rotational driving of the motor 105 with the main drive pulse P11. In this manner, the pulse-down control is performed.

As has been explained above, the motor control circuit according to this embodiment selects any one of the main drive pulses out of the plurality of main drive pulses based on the relationship of a magnitude between the time until the rotation detection signal which is indicative of the rotation of the motor is detected and the predetermined reference time, and rotationally drives the motor based on the selected main drive pulse. Accordingly, it is possible to rotationally drive the motor with the main drive pulse having the energy corresponding to the load of the motor with the simple constitution without using the counter circuit whereby the reduction of power consumption can be realized. Further, by forming the motor control circuit into an integrated circuit, it is possible to miniaturize the motor control circuit.

Further, according to the analogue electronic clock of the above-mentioned each embodiment, it is possible to rotationally drive the motor with the main drive pulse having the energy corresponding to the load with the simple constitution and hence, the reduction of power consumption and the miniaturization of the electronic clock can be realized.

Next, an analogue electronic clock according to another embodiment of the present invention is explained. Here, a block diagram of this embodiment and a constitutional view of a stepping motor used in the analogue electronic clock are equal to FIG. 1 and FIG. 2. Further, in the explanation of another embodiment made hereinafter, parts identical with the parts shown in FIG. 1 to FIG. 5 are given same symbols and their explanation is omitted.

Figure 6:
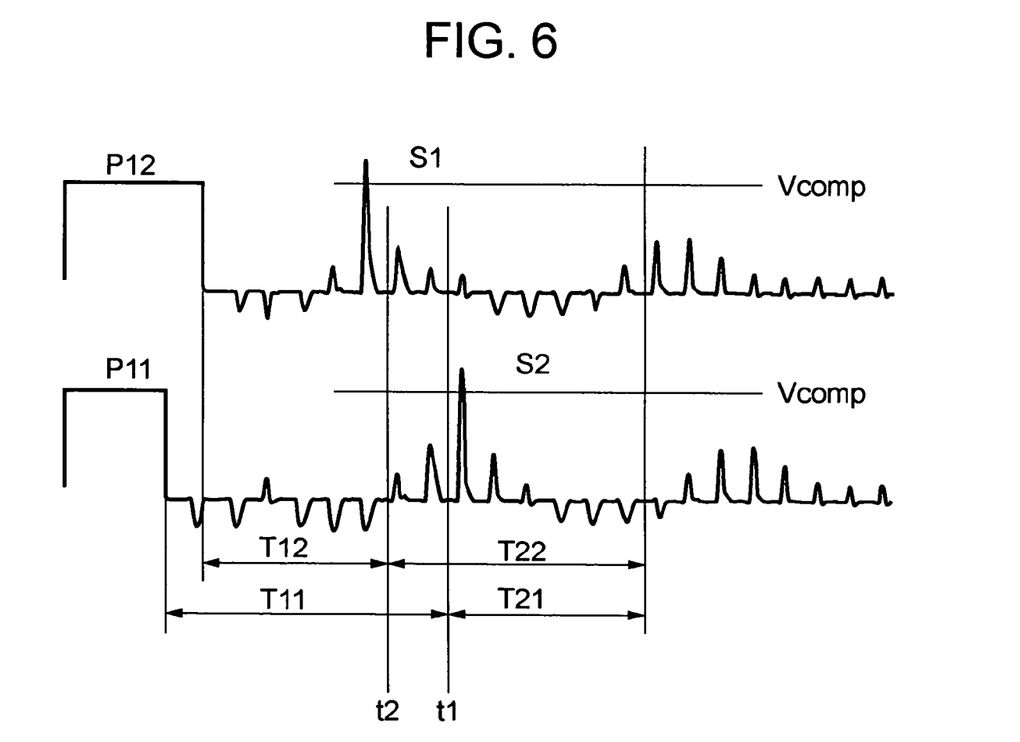
FIG. 6 is timing chart showing an operation of the analogue electronic clock according to another embodiment of the present invention.

FIG. 6 is a timing chart showing a plurality of (two kinds in this embodiment) main drive pulses (the first main drive pulse P11 having a first pulse width, the second main drive pulse P12 having a second pulse width which has larger energy than the first main drive pulse) and a rotation detection signal which expresses whether the motor 105 is rotated or not used in this embodiment.

In FIG. 6, the main drive pulses P11, P12 and the correction drive pulse P2 described later are, in the same manner as the embodiment shown in FIG. 3, configured to have respective pulse widths thereof set in order of P11<P12<P2.

Out of the rotation detection signals shown in FIG. 6, the rotation detection signals S1, S2 of levels which exceed the predetermined reference signal voltage Vcomp are rotation detection signals which are indicative of the rotation of the motor 105, while the rotation detection signals of levels which are equal to or below the reference signal voltage Vcomp are rotation detection signals which are indicative of the non-rotation of the motor 105.

Although described later in detail, in this embodiment, respectively corresponding to the main drive pulses P11, P12, reference times "t1", "t2" which become the determination references at the time of changeover between the main drive pulses P11, P12 (pulse changeover determination times) are provided.

This embodiment is configured such that either one of the plurality of main drive pulses P11, P12 is selected based on the magnitude relationship between time from a predetermined reference time (a point of time that the supply of the main drive pulses P11, P12 to the motor 105 is finished in FIG. 6) to a point of time at which the rotation detection signal which is indicative of the rotation of the motor 105 is detected by a rotation detection circuit 110 and predetermined reference times "t1", "t2" and rotationally drives the motor 105 with the selected main drive pulse. That is, in the same manner as the above-mentioned embodiment, since a rotational speed of the motor 105 is changed corresponding to the energy of the drive pulse, by comparing the time until the rotation detection signal is detected and the predetermined reference times, it is determined whether the motor is rotationally driven with the drive pulse having the proper energy or not and the proper drive pulse is selected based on a result of the determination.

In rotationally driving the motor 105 with the main drive pulse P11, for example, when it is determined by the detection time determination circuit 111 that the rotation detection signal S2 which is indicative of the rotation of the motor 105 is generated at the point of time earlier than the first reference time "t1" (within T11), that is, when the rotation detection signal S2 which is indicative of the rotation of the motor 105 is detected by the rotation detection circuit 110 before the predetermined reference time "t1" elapses, the control circuit 103 determines that the rotational driving is performed with proper energy for the load of the motor 105 and continues the rotational driving of the motor 105 with the main drive pulse P11.

In rotationally driving the motor 105 with the main drive pulse P11, when it is determined by the detection time determination circuit 111 that the rotation detection signal S2 which is indicative of the rotation of the motor 105 is generated at the point of time later than the first reference time "t1" (within T21), that is, when the rotation detection signal S2 which is indicative of the rotation of the motor 105 is detected by the rotation detection circuit 110 after the predetermined reference time "t1" elapses, the control circuit 103 determines that the drive energy of the motor 105 is small and changes over the main drive pulse from the main drive pulse P11 to the main drive pulse P12 having larger energy than the main drive pulse P11 and continues the rotational driving of the motor 105 with the main drive pulse P12.

On the other hand, in rotationally driving the motor 105 with the main drive pulse P12, when it is determined by the detection time determination circuit 111 that the rotation detection signal S1 which is indicative of the rotation of the motor 105 is generated at the point of time earlier than the predetermined second reference time "t2" (within T12), that is, when the rotation detection signal S1 which is indicative of the rotation of the motor 105 is detected by the rotation detection circuit 110 before the predetermined second reference time "t2" elapses, the control circuit 103 determines that the motor 105 is rotationally driven with the excessive energy for the load of the motor 104 and changes over the rotational driving of the motor 105 to the rotational driving with the main drive pulse P11 having the smaller energy than the main drive pulse P12.

On the other hand, in rotationally driving the motor 105 with the main drive pulse P12, when it is determined by the detection time determination circuit 111 that the rotation detection signal S1 which is indicative of the rotation of the motor 105 is generated at the point of time later than the predetermined second reference time "t2" (within T22), that is, when the rotation detection signal S2 which is indicative of the rotation of the motor 105 is detected by the rotation detection circuit 110 after the predetermined second reference time "t2" elapses, the control circuit 103 determines that the drive energy of the motor 105 is proper and the rotational driving of the motor 105 with the main drive pulse P12 is continued.

In this manner, this embodiment is configured such that either one of the plurality of main drive pulses P11, P12 is selected corresponding to the magnitude of the load and the motor 105 is driven with the selected main drive pulse, wherein when the load is small, the motor 105 is rotationally driven with the main drive pulse P11 and when the load is large so that the motor 105 is not rotationally driven with the main drive pulse P11, the motor 105 is rotationally driven with the main drive pulse P12. Accordingly, by eliminating the driving of the motor 105 with the correction drive pulse P2 as much as possible, it is possible to realize power saving.

Figure 7:
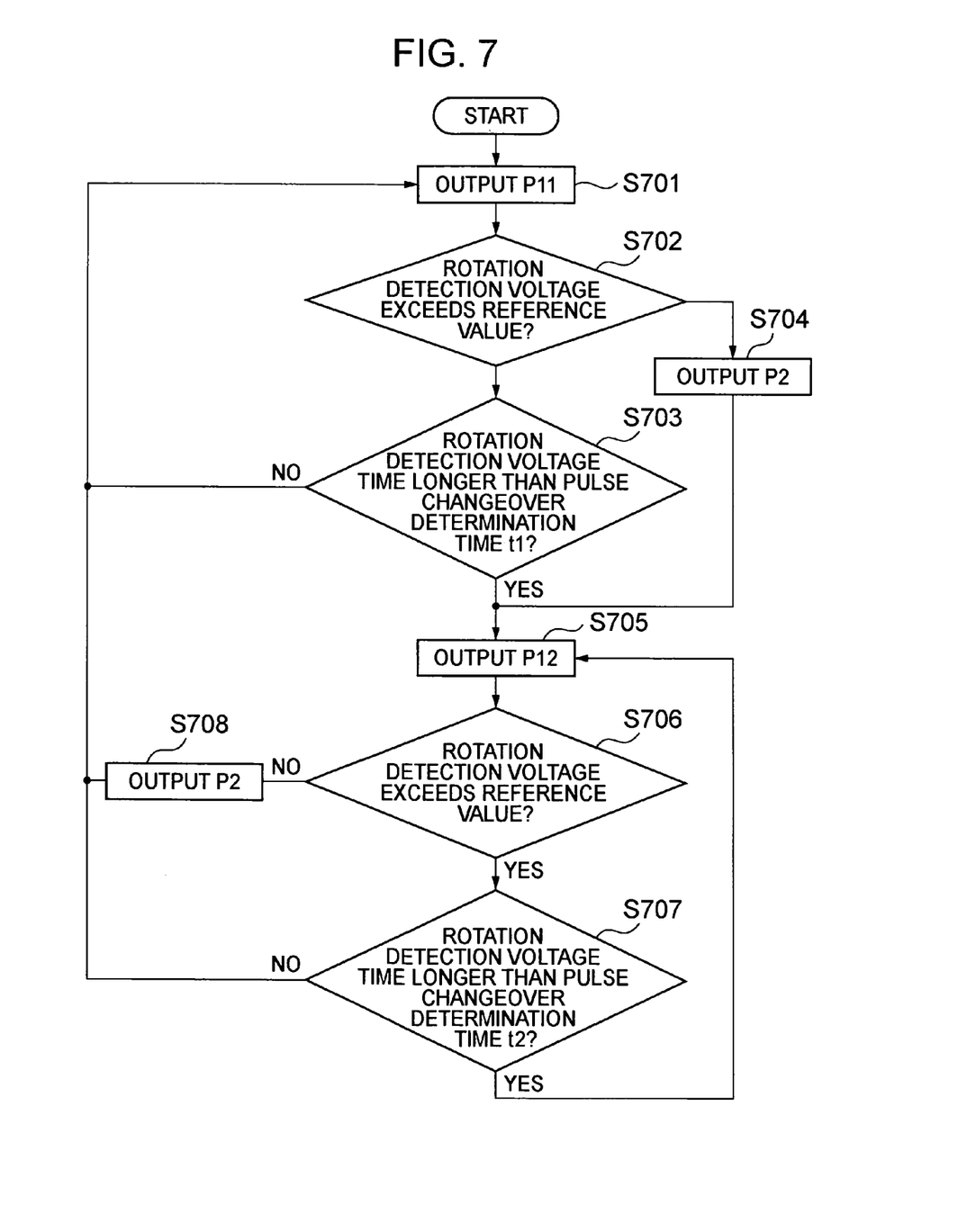
FIG. 7 is a flow chart showing the manner of operation of the analogue electronic clock according to an embodiment of the present invention.

FIG. 7 is a flowchart showing the manner of operation of the analogue electronic clock according to another embodiment of the present invention and is mainly a flowchart showing processing of the control circuit 103.

Figure 8A:
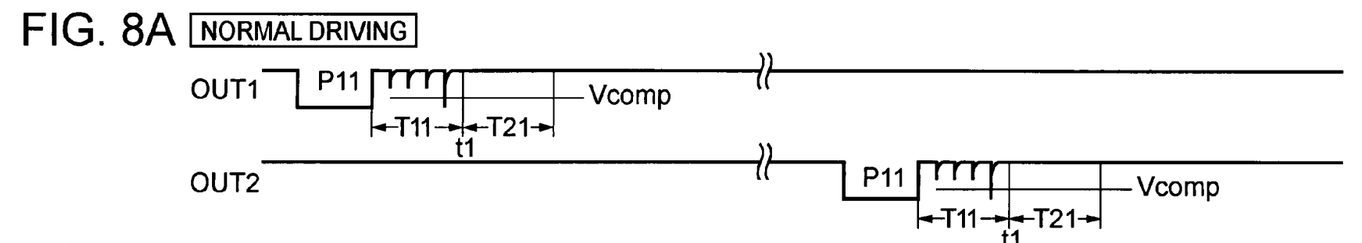
FIG. 8 are timing charts showing the operation of the analogue electronic clock according to another embodiment of the present invention.
Figure 8B:
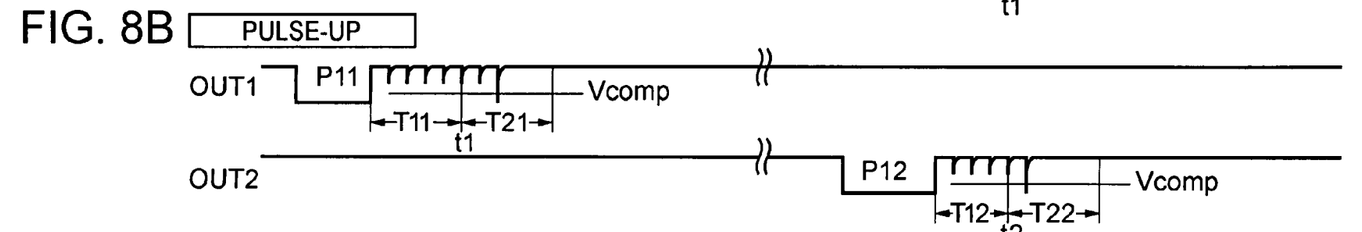
Figure 8C:
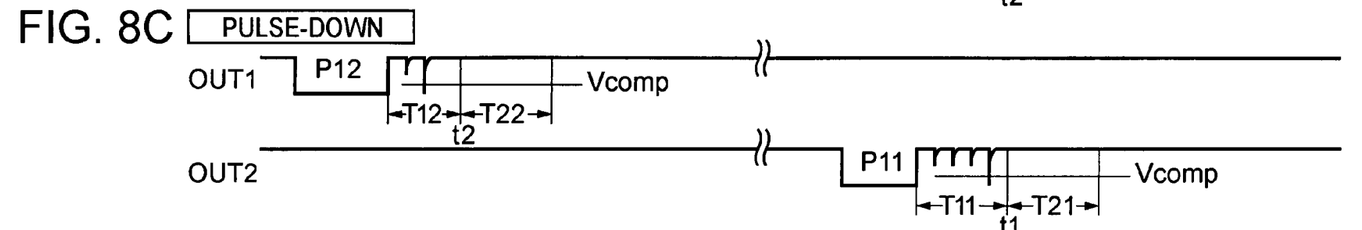

FIG. 8 is a timing chart showing the manner of operation of the analogue electronic clock according to this embodiment.

Hereinafter, in conjunction with FIG. 1, FIG. 2 and FIG. 6 to FIG. 8, the manner of operation of the analogue electronic clock according to another embodiment of the present invention and the motor control circuit suitably applicable to the analogue electronic clock is explained by mainly focusing on portions which makes another embodiment different from the above-mentioned embodiment.

First of all, the usual drive operation (see FIG. 8A) in which the motor load is small and the motor 105 is rotationally driven with the main drive pulse P11 is explained.

In this case, first of all, the control circuit 103 performs the timer counting by counting time signals from the frequency dividing circuit 102 and, at a predetermined timing, generates a control signal for rotationally driving the motor 105 with the first main drive pulse P11 having the short pulse width (step S701 in FIG. 7).

The drive pulse selection circuit 104, in response to the control signal from the control circuit 103, rotationally drives the motor 105 with the main drive pulse P11. The motor 105 is rotationally driven with the main drive pulse P11 and rotationally drives the time hands 107 to 109. Accordingly, the display part 106 sequentially displays the present time using the time hands 107 to 109.

The rotation detection circuit 110 detects the rotation detection signal which is indicative of a rotation state from the motor 105 and outputs the rotation state to the detection time determination circuit 111. The detection time determination circuit 111 compares the rotation detection signal from the rotation detection circuit 110 and the predetermined reference signal voltage Vcomp, determines whether the rotation detection signal voltage exceeds the predetermined reference signal voltage Vcomp or not, that is, whether the motor 105 is rotated or not, and notifies whether the motor 105 is rotated or not to the control circuit 103. Further, when the detection time determination circuit 111 detects the rotation detection signal which exceeds the above-mentioned reference signal voltage Vcomp, the detection time determination circuit 111 compares the time from the completion of supply of the main drive pulse P11 to the motor 105 to the point of time that the rotation detection signal is generated with the predetermined reference time (pulse changeover determination time) "t1", and notifies whether the time to the point of time that the rotation detection signal is generated is larger (longer) than the reference time "t1" or not to the control circuit 103.

The control circuit 103, based on the information from the detection time determination circuit 111, determines whether the voltage of the rotation detection signal exceeds the reference signal voltage Vcomp or not, that is, whether the motor 105 is rotated or not (step S702).

Further, when the control circuit 103 determines that the rotation detection signal voltage exceeds the reference signal voltage Vcomp, that is, the motor 105 is rotated in step S702, the control circuit 103 determines whether the time from the completion of supply of the main drive pulse P11 to the motor 105 to the point of time that the rotation detection signal is generated is longer than the pulse changeover determination time "t1" which is the first reference time or not (step S703).

When the control circuit 103 determines that the time to the point of time that the rotation detection signal is generated is longer than the pulse changeover determination time "t1" in step S703, the control circuit 103 determines that the drive energy is more or less insufficient with the main drive pulse P11 and performs a control to rotationally drive the motor 5 by changing over the main drive pulse P11 to the main drive pulse P12 having the larger energy than the main drive pulse P11 (step S705).

Further, when the control circuit 103 determines that the rotation detection signal voltage does not exceed the reference signal voltage Vcomp, that is, the motor 105 is not rotated in step S702, the control circuit 103 rotationally drives the motor 105 with the correction drive pulse P2 and, thereafter, performs a control to rotationally drive the motor 105 by changing over the correction drive pulse. P2 to the main drive pulse P12 (step S704).

When the control circuit 103 determines that the time to the point of time that the rotation detection signal is generated is not longer than the pulse changeover determination time "t1" in step S703, the control circuit 103 determines that the rotational driving of the motor 105 with the main drive pulse P11 is proper and returns to step S701.

The control circuit 103, after rotationally driving the motor 105 with the main drive pulse P12 in step S705, determines whether the rotation detection signal voltage exceeds the reference signal voltage Vcomp or not, that is, the motor 105 is rotated or not based on the information from the detection time determination circuit 111 (step S706).

When the control circuit 103 determines that the rotation detection signal voltage exceeds the reference signal voltage Vcomp, that is, the motor 105 is rotated in step S706, the control circuit 103 determines whether the time from the completion of supply of the main drive pulse P12 to the motor 105 to the point of time that the rotation detection signal is generated is longer than the pulse changeover determination time "t2" which is the second reference time shorter than the above-mentioned pulse changeover determination time "t1" (step S707)

When the control circuit 103 determines that the time to the point of time that the rotation detection signal is generated is larger (longer) than the pulse changeover determination time "t2" in step S707, the control circuit 103 determines that the drive energy is more or less insufficient with the main drive pulse P11 and the driving of the motor 105 with the main drive pulse P12 is proper and returns to step S705 and performs a control to continue the rotational driving of the motor 105 with the main drive pulse P12.

When the control circuit 103 determines that the rotation detection signal voltage does not exceed the reference signal voltage Vcomp, that is, the motor 105 is not rotated in step S706, the control circuit 103 performs a control such that the control circuit 103 performs the rotational driving of the motor 105 with the correction drive pulse P2 and, thereafter, returns to step S701 and performs the rotational driving of the motor 105 by changing over the correction drive pulse P2 to the main drive pulse P11. (step S708).

Further, when the control circuit 103 determines that the time to the point of time that the rotation detection signal is generated is not longer than the pulse changeover determination time "t2" in step. S707, the control circuit 103 determines that the drive energy is excessively large with the main drive pulse P12 and the driving of the motor 105 with the main drive pulse P11 is proper and returns to step S701 and performs a control to continue the rotational driving of the motor 105 by changing over the main drive pulse P12 to the main drive pulse P11.

As has been explained above, according to another embodiment, it is possible to obtain not only the advantageous effects substantially equal to the advantageous effect of the above-mentioned embodiment but also an advantageous effect that the changeover between the main drive pulses P11, P12 can be performed without performing the driving of the motor 105 with the correction drive pulse P2 as an intermediate operation so that the further energy saving is achieved. Further, it is possible to prevent the occurrence of the failure of pulse-down from the main drive pulse P12 to the main drive pulse P11 due to the irregularities of detection times which are generated attributed to the irregularities of parts per se such as rotor, stator and the like or assembling irregularities.

Here, according to another embodiment, although the plurality of pulse changeover determination times "t1", "t2" are set different from each other, these pulse changeover determination times "t1", "t2" may be set equal to each other.

Further, in the above-mentioned embodiments, as the plurality of main drive pulses which differ in drive energy, the main drive pulses which differ in the pulse width from each other are used. However, the plurality of main drive pulses may differ from each other in the voltage level of the drive pulse or the plurality of main drive pulses may differ from each other in both of the pulse width and the voltage level of the drive pulse.

According to the motor control circuit of the present invention, it is possible to rotationally drive the motor with the main drive pulse having the energy corresponding to a load with the simple constitution without using the counter circuit. Further, the reduction of power consumption can be realized.

Further, by eliminating the driving with the correction drive pulse at the time of: performing the changeover between the main drive pulses, it is possible to realize the further reduction of power consumption.

Further, according to the analogue electronic clock of the present invention, it is possible to rotationally drive the motor with the main drive pulse having the energy corresponding to a load with the simple constitution without using the counter circuit. Further, the reduction of power consumption can be realized.

The analogue electronic clock of the present invention is applicable to various analogue electronic clocks including an analogue electronic wrist watch, an analogue electronic table clock, an analogue electronic clock with a calendar, and is particularly applicable to an analogue electronic clock which uses a battery as a power source.

Further, the motor control circuit of the present invention is applicable to motor control circuits of various motors besides the motor control circuit for a stepping motor for driving time hands and the calendar of the above-mentioned analogue electronic clock.

What is claimed is:

1. A motor control circuit comprising:
   rotation detection means for detecting a rotation detection signal produced in response to rotation of a motor and for detecting whether or not the motor has rotated based on the rotation detection signal; and
   control means for selecting a main drive pulse corresponding to a magnitude of a load of the motor out of a plurality of main drive pulses which differ in energy from each other and supplying the selected main drive pulse to the motor to rotationally drive the motor and, when the rotation detection means detects that the motor has not rotated in response to the supplied main drive pulse based on the rotation detection signal, forcibly rotationally driving the motor with a correction drive pulse having energy larger than the respective main drive pulses,
   wherein the control means successively selects one of the main drive pulses out of the plurality of main drive pulses based on whether the immediately preceding rotation detection signal which is indicative of the rotation of the motor is detected by the rotation detection means before or after a predetermined reference time, and rotationally drives the motor based on the selected main drive pulse, and
   wherein the control means, in rotationally driving the motor with the main drive pulse having large energy relative to at least one other main drive pulse, when the rotation detection signal which is indicative of the rotation of the motor is detected by the rotation detection means before a lapse of a second reference time, changes the drive pulse such that the control means rotationally drives the motor with the main drive pulse having smaller energy than the main drive pulse having large energy.

2. A motor control circuit according to claim 1, wherein the first and second reference times are an equal time.

3. A motor control circuit comprising:
   rotation detection means for detecting a rotation detection signal produced in response to rotation of a motor and for detecting whether or not the motor has rotated based on the rotation detection signal; and
   control means for selecting a main drive pulse corresponding to a magnitude of a load of the motor out of a plurality of main drive pulses which differ in energy from each other and supplying the selected main drive pulse to the motor to rotationally drive the motor and, when the rotation detection means detects that the motor has not rotated in response to the supplied main drive pulse based on the rotation detection signal, forcibly rotationally driving the motor with a correction drive pulse having energy larger than the respective main drive pulses,
   wherein the control means successively selects one of the main drive pulses out of the plurality of main drive pulses based on whether the immediately preceding rotation detection signal which is indicative of the rotation of the motor is detected by the rotation detection means before or after a predetermined reference time, and rotationally drives the motor based on the selected main drive pulse, and
   wherein the control means, in rotationally driving the motor with the main drive pulse having large energy relative to at least one other main drive pulse, when the rotation detection signal which is indicative of the rotation of the motor is detected by the rotation detection means after a lapse of the second reference time, rotationally drives the motor without changing the main drive pulse.

4. A motor control circuit according to claim 3, wherein the control means, in rotationally driving the motor with the main drive pulse, when the rotation detection signal which is indicative of the rotation of the motor is not detected by the rotation detection means, rotationally drives the motor with the correction drive pulse.

5. A motor control circuit according to claim 3, wherein the first and second reference times are an equal time.

6. A motor control circuit comprising:
   rotation detection means for detecting a rotation detection signal produced in response to rotation of a motor and for detecting whether or not the motor has rotated or not based on the rotation detection signal; and
   control means for selecting a main drive pulse corresponding to a magnitude of a load of the motor out of first and second main drive pulses which differ in energy from each other and supplying the selected main drive pulse to the motor to rotationally drive the motor and, when the rotation detection means detects that the motor has not rotated in response to the supplied main drive pulse based on the rotation detection signal, forcibly rotationally driving the motor with a correction drive pulse having energy larger than the respective main drive pulses, wherein
   the control means, in rotationally driving the motor with the first main drive pulse having a first pulse width, when the rotation detection signal which is indicative of the rotation of the motor is detected by the rotation detection means before a lapse of a first reference time and before the next main drive pulse is supplied to the motor, rotationally drives the motor without changing the main drive pulse,
   the control means, in rotationally driving the motor with the first main drive pulse, when the rotation detection signal which is indicative of the rotation of the motor is detected by the rotation detection means after a lapse of the first reference time and before the next main drive pulse is supplied to the motor, changes the drive pulse such that the motor is rotationally driven with the second main drive pulse having larger energy than the first main drive pulse,
   the control means, in rotationally driving the motor with the second main drive pulse, when the rotation detection signal which is indicative of the rotation of the motor is detected by the rotation detection means before a lapse of a second reference time and before the next main drive pulse is supplied to the motor, changes the drive pulse such that the motor is rotationally driven with the first main drive pulse,
   the control means, in rotationally driving the motor with the second main drive pulse, when the rotation detection signal which is indicative of the rotation of the motor is detected by the rotation detection means after a lapse of the second reference time and before the next main drive pulse is supplied to the motor, rotationally drives the motor without changing the main drive pulse, and the control means, in rotationally driving the motor with the first or second main drive pulse, when the rotation detection signal which is indicative of the rotation of the motor is not detected by the rotation detection means, rotationally drives the motor with the correction driving pulse.

7. A motor control circuit according to claim 6, wherein the first and second reference times are an equal time.

8. An analogue electronic clock comprising:
a motor which rotationally drives a clock hand to display time; and
a motor control circuit according to claim 6 for controlling rotation of the motor.

9. A motor control circuit for a stepping motor comprising:
a rotation detection circuit that detects whether or not a stepping motor has incrementally rotated in response to main drive pulses applied thereto and that produces after application of each main drive pulse a rotation detection signal indicative of whether or not the motor has incrementally rotated; and
a drive control circuit that, in response to a rotation detection signal indicating that the motor has incrementally rotated, selects a main drive pulse from among a plurality of main drive pulses which differ in energy from one another based on the timing at which the rotation detection signal is produced and applies the selected main drive pulse to the motor and that, in response to a rotation detection signal indicating that the motor has not incrementally rotated, selects a correction drive pulse which has a larger energy than any of the plurality of main drive pulses and applies the correction drive pulse to the motor to forcibly incrementally rotate the motor,
wherein the drive control circuit selects, as the next main drive pulse, one having the same energy as that of the immediately preceding main drive pulse when the rotation detection signal indicating incremental rotation of the motor by the preceding main drive pulse is produced before a first predetermined reference time, and
wherein the drive control circuit selects, as the next main drive pulse, one having larger energy than that of the immediately preceding main drive pulse when the rotation detection signal indicating incremental rotation of the motor by the preceding main drive pulse is produced after a second predetermined reference time.

10. A motor control circuit according to claim 9; wherein the drive control circuit selects, as the next main drive pulse, one having smaller energy than that of the immediately preceding main drive pulse of larger energy when the rotation detection signal indicting incremental rotation of the motor by the preceding main drive pulse of larger energy is produced before the second predetermined reference time.

11. A motor control circuit according to claim 10; wherein the first predetermined reference time is longer than the second predetermined reference time.

12. A method of incrementally rotating a stepping motor by successively applying main drive pulses to the motor, the method comprising:
detecting whether or not the stepping motor has incrementally rotated in response to main drive pulses applied thereto and producing after application of each main drive pulse a rotation detection signal indicative of whether or not the motor has incrementally rotated;
selecting, in response to a rotation detection signal indicating that the motor has incrementally rotated, a main drive pulse from among a plurality of main drive pulses which differ in energy from one another and applying the selected main drive pulse to the motor, the selection of the main drive pulse being based on the timing at which the rotation detection signal is produced; and
selecting, in response to a rotation detection signal indicating that the motor has not incrementally rotated, a correction drive pulse which has a larger energy than any of the plurality of main drive pulses and applying the correction drive pulse to the motor to forcibly incrementally rotate the motor.

13. A method according to claim 12; wherein, in response to a rotation detection signal indicating incremental rotation of the motor, the next selected main drive pulse is one having the same energy as that of the immediately preceding main drive pulse when the rotation detection signal indicating incremental rotation of the motor by the preceding main drive pulse is produced after a predetermined reference time.

14. A method according to claim 13; wherein, in response to a rotation detection signal indicating incremental rotation of the motor, the next selected main drive pulse is one having smaller energy than that of the immediately preceding main drive pulse when the rotation detection signal indicating incremental rotation of the motor by the preceding main drive pulse is produced before the predetermined reference time.

15. A method according to claim 13; wherein the next selected main drive pulse following a correction drive pulse is the main drive pulse having the largest energy.

16. A method according to claim 15; wherein, in response to a rotation detection signal indicating incremental rotation of the motor, the next selected main drive pulse is one having smaller energy than that of the immediately preceding main drive pulse when the rotation detection signal indicating incremental rotation of the motor by the preceding main drive pulse is produced before the predetermined reference time.

17. A method according to claim 12; wherein, in response to a rotation detection signal indicating incremental rotation of the motor, the next selected main drive pulse is one having the same energy as that of the immediately preceding main drive pulse when the rotation detection signal indicating incremental rotation of the motor by the preceding main drive pulse is produced before a first predetermined reference time.

18. A method according to claim 17; wherein, in response to a rotation detection signal indicating incremental rotation of the motor, the next selected main drive pulse is one having larger energy than that of the immediately preceding main drive pulse when the rotation detection signal indicating incremental rotation of the motor by the preceding main drive pulse is produced after a second predetermined reference time.

19. A method according to claim 18; wherein, in response to a rotation detection signal indicating incremental rotation of the motor, the next selected main drive pulse is one having smaller energy than that of the immediately preceding main drive pulse when the rotation detection signal indicating incremental rotation of the motor by the preceding main drive pulse is produced before the second predetermined reference time.

20. A method according to claim 19; wherein the first predetermined reference time is longer than the second predetermined reference time.

21. In an analogue electronic timepiece having a stepping motor that incrementally rotates one or more timepiece hands to indicate time, a method of incrementally rotating the motor according to claim 12.

* * * * *